US006125195A

United States Patent [19]

Ohya et al.

[11] Patent Number: 6,125,195

[45] Date of Patent: Sep. 26, 2000

[54] BILL VALIDATOR OF MASTER-SLAVE TYPE AND METHOD FOR DOWNLOAD OF VALIDATOR

[75] Inventors: Toitsu Ohya; Koji Kuroiwa, both of Sagamihara, Japan

[73] Assignee: Japan Cash Machine Co., Ltd., Osaka, Japan

[21] Appl. No.: 09/043,103

[22] PCT Filed: Oct. 31, 1997

[86] PCT No.: PCT/JP97/03980

§ 371 Date: Apr. 21, 1998

§ 102(e) Date: Apr. 21, 1998

[87] PCT Pub. No.: WO98/19276

PCT Pub. Date: May 7, 1998

[30] Foreign Application Priority Data

Oct. 31, 1996 [JP] Japan .................................... 8-290779

[51] Int. Cl.[7] ........................................ G06K 9/00

[52] U.S. Cl. ........................................ 382/135

[58] Field of Search .................................... 382/135, 307, 382/305; 356/71; 399/366; 235/474

[56] References Cited

U.S. PATENT DOCUMENTS

| | | | |
|---|---|---|---|
| 4,513,439 | 4/1985 | Gorgone et al. | 382/135 |
| 4,694,147 | 9/1987 | Amemiya et al. | 235/379 |
| 4,973,851 | 11/1990 | Lee | 250/556 |
| 5,055,834 | 10/1991 | Chiba | 340/825.34 |
| 5,390,003 | 2/1995 | Yamaguchi et al. | 399/366 |
| 5,790,932 | 8/1998 | Kamaki et al. | 399/366 |
| 5,909,502 | 6/1999 | Mazur | 382/135 |

FOREIGN PATENT DOCUMENTS

| | | | |
|---|---|---|---|
| 0383518 | 8/1990 | European Pat. Off. | G07F 7/10 |
| 2293039 | 3/1996 | United Kingdom | G07F 3/02 |

*Primary Examiner*—Andrew W. Johns
*Assistant Examiner*—Shervin Nakhjavan
*Attorney, Agent, or Firm*—Bachman & LaPointe, P.C.

[57] ABSTRACT

A bill validator of master-slave type is provided for easy downloading. A master discriminating circuit (40) is switched from a validating mode to a master mode by operation of the master mode switch (48) to forward the download information to a slave discriminating circuit (40) according to the download program. The slave discriminating circuit (40) is switched from a validating mode to a slave mode by operation of the slave mode switch (49) so that the download information from the master discriminating circuit (40) is written according to the download program in the writable memory (43) of the slave discriminating circuit (40) via the download output terminal (44) of the master discriminating circuit (40) and the download input terminal (46) of the slave discriminating circuit (40).

11 Claims, 4 Drawing Sheets

BILL VALIDATOR OF MASTER-SLAVE TYPE AND METHOD FOR DOWNLOAD OF VALIDATOR

TECHNICAL FIELD

This invention relates to a bill validator, in particular to a method for download of a validator and a bill validator of master-slave type having a memory in which software control program can easily be updated.

BACKGROUND ART

Bill validators of many types have been used for vending machines, dispensers, ticket vending machines or money exchangers to discriminate authenticity of bills inserted therein. A typical bill validator includes a conveyer for transporting a bill inserted from an inlet to an outlet along a passageway formed in the validator; sensors positioned in vicinity of the passageway for detecting magnetic or optical features of the bill during transportation of the bill; a discriminating circuit for receiving signals from the sensors and deciding whether the bill is genuine or false; and a stacker for storing bills which are decided genuine by the discriminating circuit and forwarded by the conveyer.

During transportation of the bill toward the outlet by the conveyer, the sensors detect optical or magnetic features of the bill and forward outputs to the discriminating circuit which then compares the detected optical or magnetic features with predetermined patterns stored in the validator. When they are coincident, the discriminating circuit decides that the bill is genuine, and subsequently the bill is continuously transported by the conveyer through the outlet to the stacker. Adversely, when they are incoincident, the bill is returned to the inlet by driving the conveyer in the reverse direction.

A current bill validator utilizes a discriminating circuit of a microcomputer which includes software control program for effectively validating genuine or false bill according to the electric signals from the sensors. The microcomputer also contains software control program for controlling drive of the conveyer to decide whether the bill is transported to the stacker or returned to the inlet. The software control program also controls a stacking operation of the genuine bill in the stacker.

To install the software control program in the microcomputer of the bill validator, it is connected with an external computer such as a personal computer including necessary software control program. Then, the bill validator is switched to a slave mode, and an operating program is carried out in the external computer switched to a master mode. Subsequently, an indication “DOWNLOADING” is selected from menu on display of the external computer so that files of the control program are electrically forwarded to and installed in the bill validator. After the installation of the control program, the bill validator is electrically disconnected from the external computer, and then another bill validator is connected to the computer for next installation of the control program.

In this way, the prior art installing operation for writing software control program in bill validators requires a specified personal computer or dedicated hardware for downloading. Also, when software control program are updated or upgraded in bill validators of the field, a plurality of personal computers must be prepared and transported to the field, thereby resulting in troublesome downloading operation. Alternatively, it is possible to write new control program for bill validation in a PROM (Programmable Read Only Memory) which is then substituted for old one in a bill validator. However, in this case, the old ROM must be removed from a printed board of the bill validator to exchange the old ROM for new one which then must be mounted on the printed board. This operation is complicated and time-consuming. Moreover, in some cases, a new ROM is irretrievably broken down because it is electrically or mechanically damaged by contact with a some object during this operation.

An object of the present invention is to provide a method for download of a validator and a bill validator which can easily perform download operation of updating software control program in a writable memory for update.

Another object of the invention is to provide a method for download of a bill validator and a bill validator capable of updating software control program without any specified personal computer or dedicated hardware for download.

Still another object of the invention is to provide a method for download of a bill validator and a bill validator used for master-slave system for download of software control program to be installed therein.

A further object of the invention is to provide a method for download of a bill validator and a bill validator which can easily be converted into a master.

DISCLOSURE OF INVENTION

The bill validator (10) of master-slave type according to the present invention includes a frame (28); a passageway (13) provided within the frame (28); conveyer means (16) for transporting a bill inserted from an inlet (12) through the passageway (13) to an outlet (14) along the passageway (13); sensor means (20 to 26) positioned in vicinity of the passageway (13) for detecting magnetic or optical feature of the bill; and discriminating means (40) for deciding based on signals from the sensor means (20 to 26) whether the bill is genuine or false to control drive of the conveyer means (16). The bill validator (10) comprises a download input terminal (46) and a download output terminal (44) provided in the discriminating means (40) which include download information; master mode setting means (48) for switching the discriminating means (40) from a validating mode to a master mode; slave mode setting means (49) for switching the discriminating means (40) from the validating mode to a slave mode; and a writable memory (43) provided in the discriminating means (40) to write therein the download information including a download program. The discriminating means (40) is switched from the validating mode to the master mode by operation of the master mode setting means (48) to forward the download information to a slave discriminating means (40) according to the download program. The slave discriminating means (40) is switched from validating mode to a slave mode by operation of the slave mode setting means (49) so that the download information from the master discriminating means (40) is written in the writable memory (43) of the slave discriminating means (40) via the download output terminal (44) of the master discriminating means (40) and the download input terminal (46) of the slave discriminating means (40).

In accordance with the present invention, the download operation of the invention does not require any specified personal computer or dedicated hardware for downloading. Therefore, the download operation for bill validators in particular in the field is very easy in a timesaving way. Also, it is very easy to provide a master validator because the validator can be utilized as either of a master and a slave for download operation.

In an embodiment of the present invention, the download information starts to be written in the slave discriminating means (40) when trigger means (47) of the master discriminating means (40) is switched to a download mode after the slave discriminating means (40) is switched to the slave mode. The discriminating means (40) includes a CPU mask ROM (45) for storing slave mode setting program, and the writable memory (43) comprises a flash memory or an EPROM for storing the download program. The master mode setting means (48), slave mode setting means (49) and trigger means (47) respectively include a master mode switch (48), download mode switch (49) and trigger switch (47). The writable memory (43) includes a flash memory or an EPROM for storing necessary information of download program for download and software control programs for validating bills and driving the conveyer. A ROM (45) is provided which includes a writable or memorizable and calculable or computable CPU mask ROM or hybrid IC for storing and executing a slave mode setting program.

The method for download of a validator according to the present invention comprises the steps of: electrically connecting download output terminal (44) of a discriminating circuit (40) of a master validator with download input terminal (46) of a discriminating circuit (40) of a slave validator; switching the discriminating circuit (40) of the master validator to a master mode and also switching the discriminating circuit (40) of the slave validator to a slave mode; reading out download information including a download program from a writable memory (43) of the master discriminating circuit (40) to operate the download program; forwarding the download program from the master writable memory (43) through the master download output terminal (44) and slave download input terminal (46) to a ROM (45) of the slave discriminating circuit (40); and writing the download information in the slave writable memory (43). The discriminating circuit (40) of the master validator is switched to a master mode by operating a master mode switch (48), and the discriminating circuit (40) of the slave validator is switched to a slave mode by operating a slave mode switch (49). A trigger switch (47) may be operated to start the download operation.

BEST MODE FOR CARRYING OUT THE INVENTION

An embodiment of a bill validator according to the present invention is described hereinafter in connection with FIGS. 1 to 5 of the attached drawings.

Figure 1:
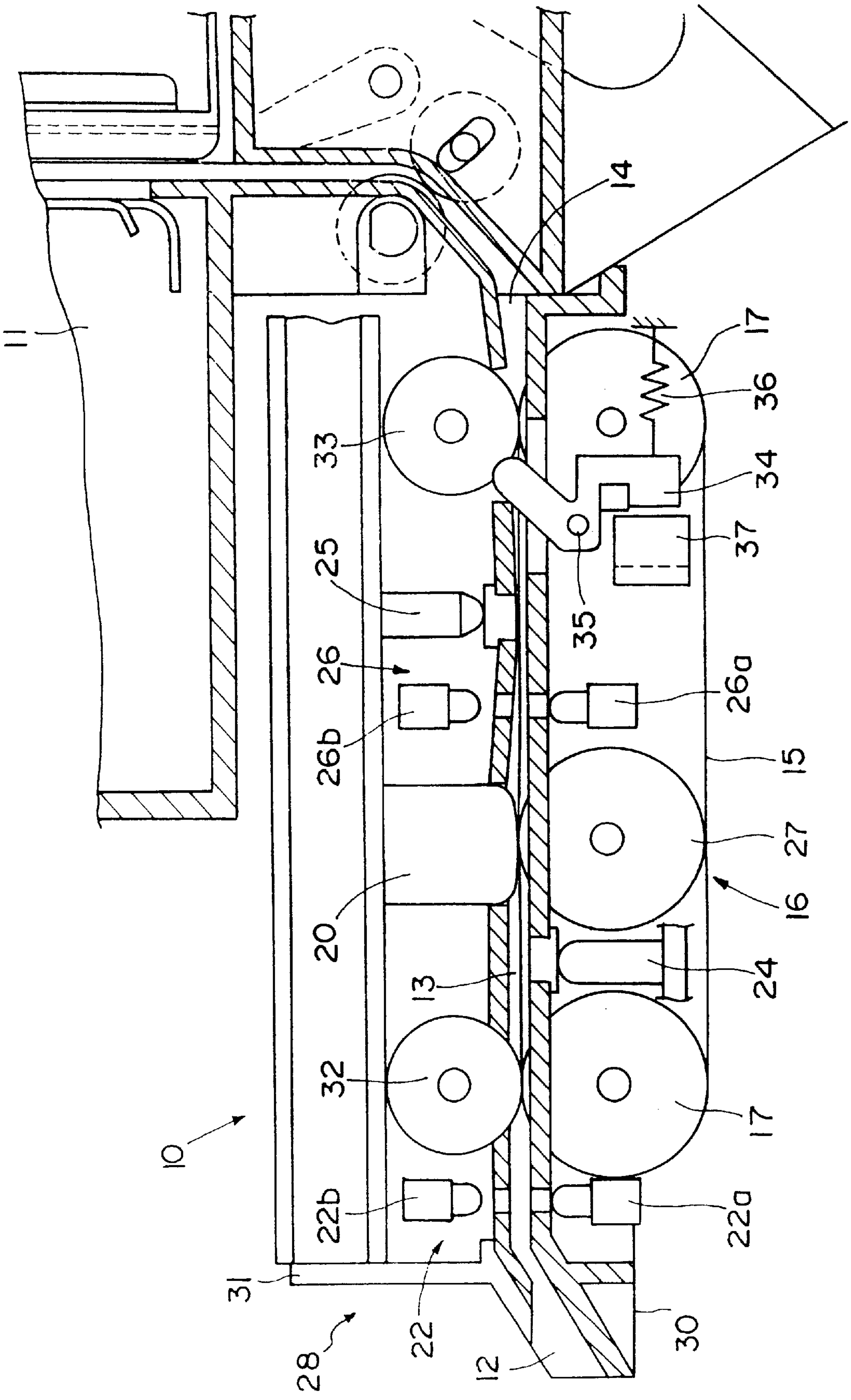
FIG. 1 is a sectional view of a bill validator according to the present invention.
Figure 2:
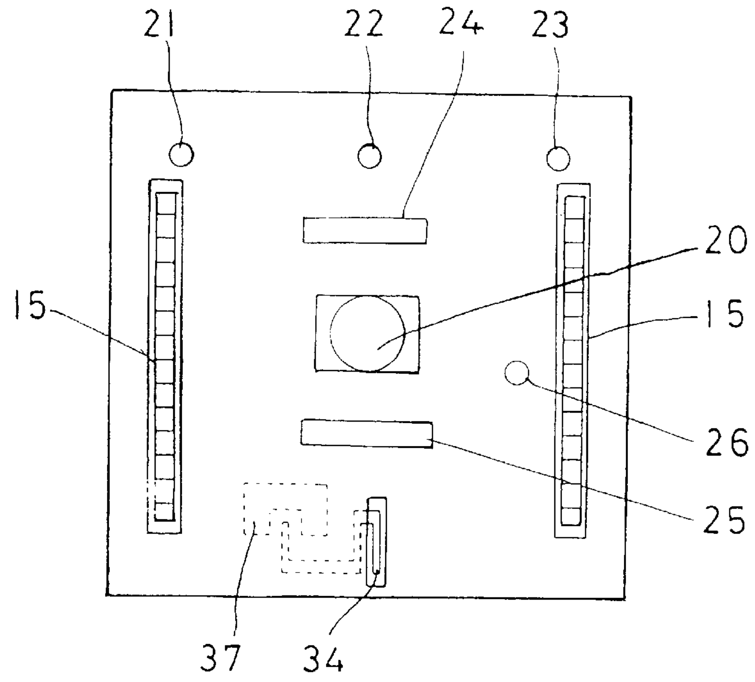
FIG. 2 is a plan view of the bill validator removing an upper frame of FIG. 1.

As shown in FIGS. 1 and 2, a bill validator 10 of the present invention comprises a magnetic sensor 20 such as a magnetic head or Hall IC mounted in vicinity of the passageway 13, a pusher roller 27 for urging an inserted bill or document toward the magnetic sensor 20, and optical sensors 21 to 26 such as photocouplers each including a light emitting diode (LED) and a light receiving transistor (LRT). The magnetic sensor 20 detects ferrous ink printed in predetermined positions of bills. The inlet sensors 21 to 23 are positioned adjacent to the inlet 12 to detect permeation pattern of infrared ray through bills. For example, the inlet sensor 22 of FIG. 2 is composed of a LED 22*a* secured to a lower frame 30 of the validator 10 and a LRT 22*b* secured to an upper frame 31. The magnetic sensor 20 and the optical sensors 21 to 26 compose validating sensors.

The upper frame 31 is pivotally attached to the lower frame 30 by a shaft (not shown) to open the upper frame 31 and easily remove jammed bills within the passageway 13. The lower frame 30 and the upper frame 31 compose a general frame 28 to define the passageway 13 between the lower frame 30 and upper frame 31 as shown in FIG. 1. Each of the optical sensors 24 and 25 has a structure of parallel arrangement of a LED and a LRT in a case, and respectively receives the light beam reflected on the front and back surfaces of bills. The optical sensor 26 has a LED 26*a* secured to the lower frame 30 and a LRT 26*b* secured to the upper frame 31 to detect a position and passage of a bill by permeation pattern of infrared ray through a bill.

A conveyer 16 includes a pair of conveyer belts 15 wound around a pair of drive pulleys 17. Rollers 32, 33 are rotatably mounted on the upper frame 31 to urge the bill or document toward the conveyer belts 15 wound around the drive pulleys 17 attached to the lower frame 30. A lever 34 is rotatably mounted by a shaft 35 to the lower frame 30 at the rear of the optical sensor 25 to detect passage of the bill or document. One end of the lever 34 is connected with a tension spring 36 attached to the lower frame 30 so that the other end of the lever 34 is protruded within the passageway 13. Traveling along the passageway 13, the bill or document forces the other end of the lever 34 to rotate the lever 34 in a clockwise direction against resilient force of the spring 36 so that the bill or document can override the lever 34. A lever sensor 37 of a photocoupler optically detects one end of the rotated lever 34 when the bill passes the lever 34. As the passageway 13 is communicated at the outlet 14 with an extended passageway formed in a stacker 11 mounted on the bill validator 10, the bill is discharged from the outlet 14 by the conveyer 16 and further transported along the extended passageway.

Figure 3:
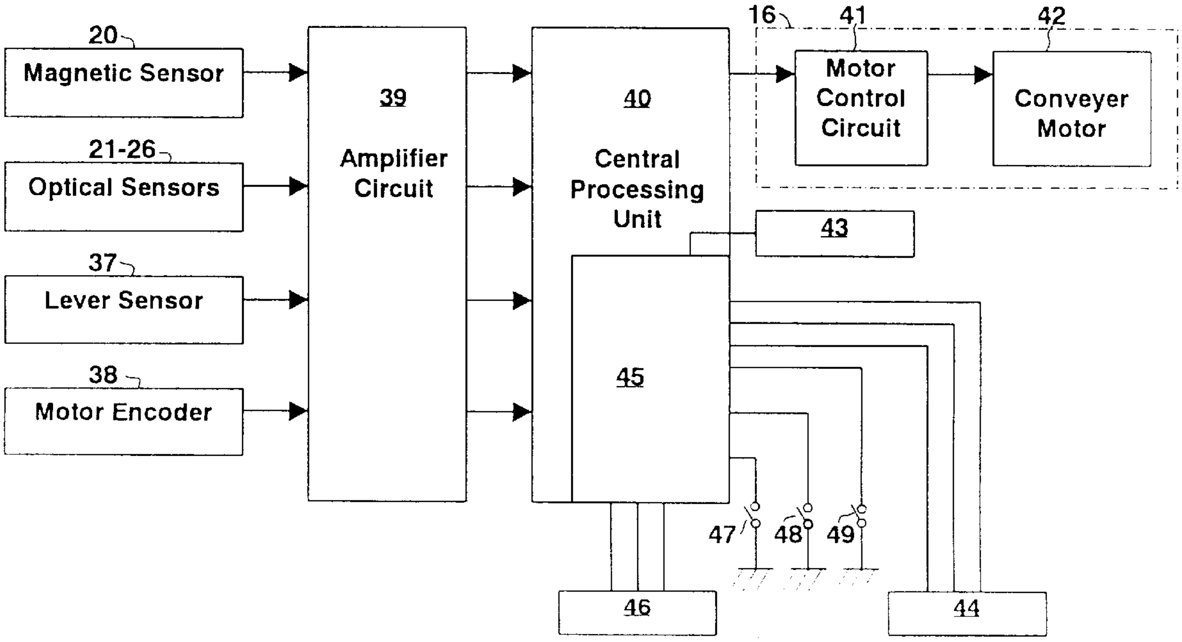
FIG. 3 is an electric circuit of the bill validator of FIG. 1.

As shown in FIG. 3, the magnetic sensor 20, the optical sensors 21 to 26, and lever sensor 37 are connected via an amplifier circuit 39 with corresponding input terminals of the discriminating circuit 40 which has output terminals respectively connected with a motor control circuit 41 of the conveyer 16. The motor control circuit 41 produces outputs to energize a conveyer motor 42 which is drivingly connected with the drive pulleys 17.

The discriminating circuit 40 is composed of a one-chip-microcomputer or a programmed central processing unit (CPU), discrete ICs or circuits which can be switched to any one of a validating mode wherein the discriminating circuit 40 can validate a bill based on outputs of the validator sensor, a master mode wherein the discriminating circuit 40 is in a readout condition, a slave mode wherein the discriminating circuit 40 is in a writable condition and a download mode wherein the download operation can be performed. Not shown but, the discriminating circuit 40 includes an optical detector for receiving outputs of the optical sensor 21 to 26 to scan optical patterns on a surface of the bill; an optical pattern memory for storing predetermined optical patterns; and a first comparator for detecting whether there is a coincidence between the outputs from the optical detector and the optical patterns stored in the optical pattern memory; a ferrous detector for receiving outputs of the magnetic sensor 20 to detect ferrous component of ink printed in predetermined positions of the bill; a magnetic pattern memory for storing predetermined magnetic patterns; and a second comparator for detecting whether there is a coincidence between the outputs from the ferrous detector and the magnetic patterns stored in the magnetic pattern memory. If the first and second comparators detect coincidences between the outputs from the optical detector and optical patterns and between the outputs from the ferrous detector and magnetic patterns, the discriminating circuit 40 generates a coincident signal to supply a drive signal to the motor control circuit 41 of the conveyer 16 in order to transport the bill to the outlet 14. In this way, the discriminating circuit 40 of the validating mode decides whether the document inserted into the validator 10 is a genuine or false bill in response to output signals from the validating sensors, and generates outputs to drive the conveyer 16.

As shown in FIG. 3, the discriminating circuit 40 comprises a writable memory 43 and a ROM 45 connected with the writable memory 43. The writable memory 43 includes a flash memory or an EPROM for storing necessary information of software control program and a download program. The ROM 45 includes a writable or memorizable and calculable or computable CPU mask ROM or hybrid IC for storing and executing a slave mode setting program. The ROM 45 has a plurality of outputs separately connected with the writable memory 43, a download output terminal 44, a download input terminal 46, a trigger switch 47 for switching the discriminating circuit 40 to the download mode wherein the download operation can be performed, a master mode switch (master mode setting means) 48 for switching the discriminating circuit 40 to the master mode wherein the discriminating circuit 40 is in a readout condition, and a slave mode switch (slave mode setting means) 49 for switching the discriminating circuit 40 in accordance with the slave mode setting program of the ROM 45 to a slave mode wherein the discriminating circuit 40 is in a writable condition. Without operation of these master mode switch 48 and slave mode switch 49, the ROM 45 is usually in the validating mode wherein the discriminating circuit 40 can validate a bill based on outputs of the validator sensor. Accordingly, the trigger switch 47 switches the ROM 45 of the discriminating circuit 40 between one of modes for example the validating mode and the download mode wherein the download operation can be performed. In the present invention, provision of the trigger switch 47 is optional. The master mode switch 48 is operated to switch the discriminating circuit 40 between the validating mode or another mode and master mode wherein the discriminating circuit 40 is in a readout condition. The slave mode switch 49 is operated to switch the discriminating circuit 40 between the validating mode or another mode and a download mode wherein the discriminating circuit 40 is in a writable condition.

The discriminating circuit 40 of master side is switched to the master mode by operation of the master mode switch 48 to then forward after operation of the trigger switch 47 necessary information including download programs to a slave discriminating circuit 40 of slave side switched to the download mode by operation of the slave mode switch 49 in accordance with the download program. The download program is executed in the slave discriminating circuit 40 which writes in the writable memory 43 download information forwarded from the discriminating circuit 40 of master side through the download input terminal 46. The download information includes download program and control programs for validating bills and driving the conveyer 16.

New programs are previously installed in the writable memory 43 of master side for later download operation on the slave discriminating circuit 40, utilizing a personal computer connected with the master discriminating circuit 40. Otherwise, new programs are installed in a new EPROM for the writable memory 43 which is then mounted on a circuit board of the discriminating circuit 40. In other words, the master discriminating circuit 40 already includes new programs because the download operation is completed thereon. In the instant invention, the discriminating circuit 40 of master side in the validator 10 is connected at the download output terminal 44 with the download input terminal 46 of the slave discriminating circuit 40 so that the download operation is performed to write new programs in the latter discriminating circuit 40. Therefore, the latter discriminating circuit 40 of slave side can be used as a master side after completion of the download operation. The writable memory 43 and ROM 45 of the discriminating circuit 40 of slave side are same as those of the discriminating circuit 40 of master side.

Figure 4:
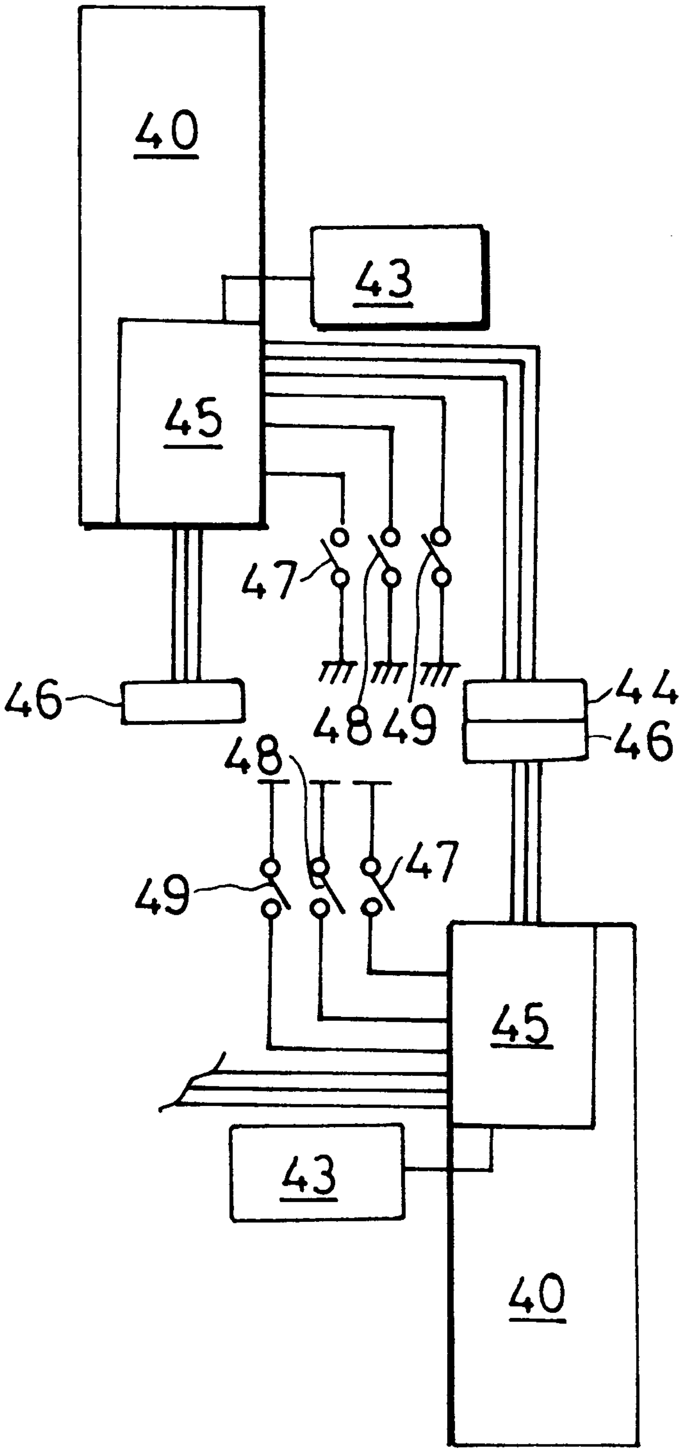
FIG. 4 is a block chart indicating two discriminating circuits connected with each other in master and slave relation for download operation.

Specifically, in actual download operation, as shown in FIG. 4, the download output terminal 44 of the discriminating circuit 40 of master side is connected with the download input terminal 46 of the discriminating circuit 40 of slave side so that a validator 10 as a master can be connected with another validator 10 as a slave through a communication line including the download output terminal 44 and download input terminal 46. If this is a first time of download operation, in lieu of the discriminating circuit 40 of master side, download output terminal of an exterior CPU board may be connected with the download input terminal 46 of slave side. When decision is made on download operation after the master and slave are connected, the master mode switch 48 of the master discriminating circuit 40 is turned ON to switch it to the master mode. Simultaneously, the slave mode switch 49 in the slave discriminating circuit 40 is turned ON to switch it to the slave mode. At the same time, the trigger switch 47 of master side is turned ON, the download information is read out from the writable memory 43 of master side in accordance with the download programs stored in the master discriminating circuit 40 so that the download information is transmitted through the master download output terminal 44 and slave download input terminal 46 to the slave discriminating circuit 40. Subsequently, the download information is written in the slave writable memory 43 in accordance with the download program of the master discriminating 40. In this case, all information including the download program is downloaded from the master to the slave and stored in the slave writable memory 43 through the master download output terminal 44 and slave download input terminal 46 so that the slave validator 10 can be utilized later as a master. Also, upon download operation, the information stored in the slave writable memory 43 is deleted or erased, and new information is stored in the slave writable memory 43 by installation of new software control program in the slave writable memory 43 through the slave ROM 45.

Figure 5:
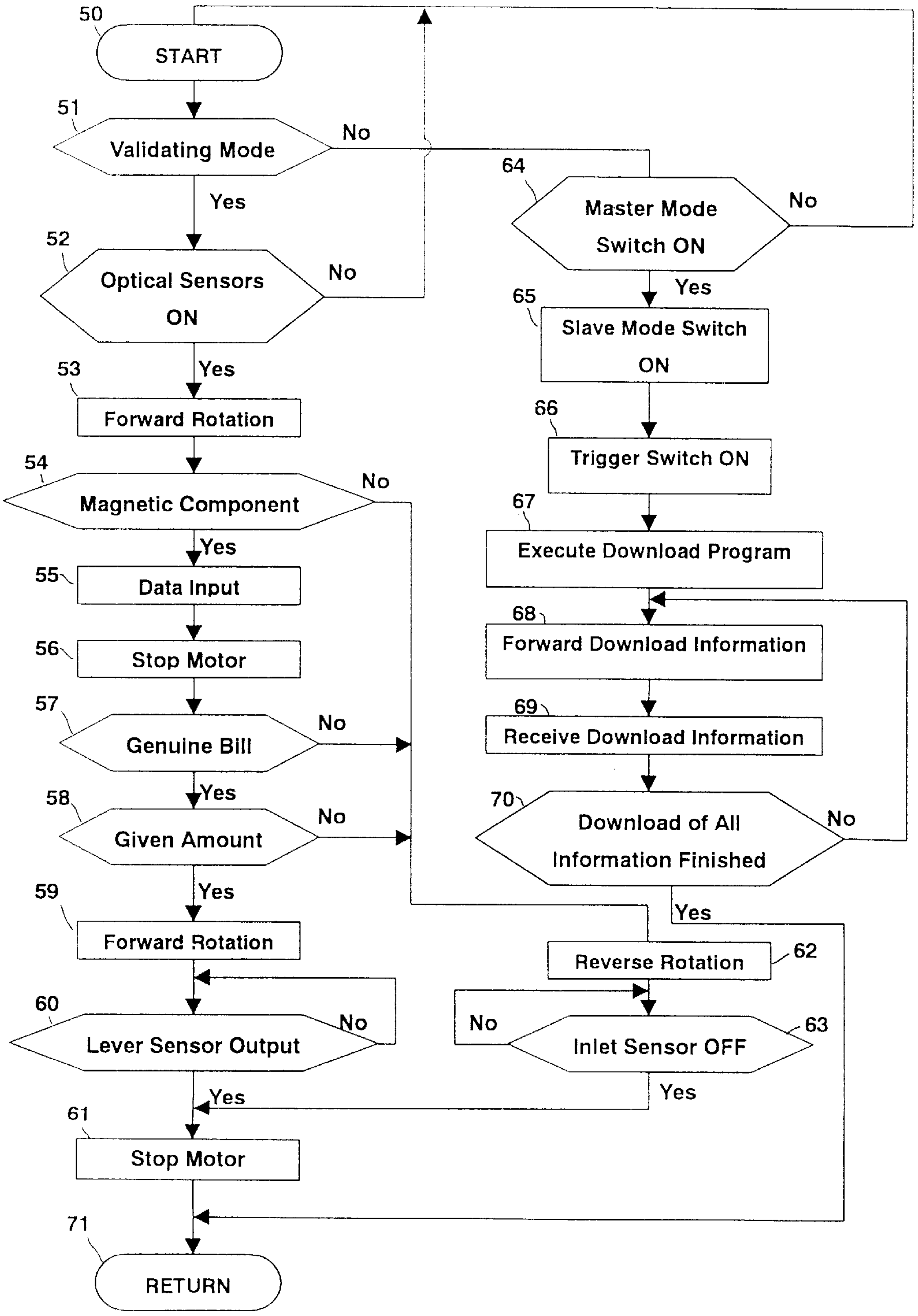
FIG. 5 is a flow chart indicating an operating sequence for download operation in the discriminating circuits shown in FIG. 4.

In use, the discriminating circuit 40 is operated in accordance with an operating sequence shown in a flow chart of FIG. 5.

A processing moves from Step 50 "START" to Step 51, the discriminating circuit 40 decides whether it is in the validating mode or master mode. When the discriminating circuit 40 decides that it is in the validating mode, the process advances in Step 52 where the discriminating circuit 40 determines whether the inlet sensors 21 to 23 detect a bill or document inserted into the inlet 12. When the discriminating circuit 40 does not determine the detection of the bill by the inlet sensors 21 to 23, the process is returned to Step 50. When the bill is inserted into the inlet 12, the inlet sensors 21 to 23 generates detection signals to the discriminating circuit 40. Then, the discriminating circuit 40 decides the detection of the bill, and supplies the motor control circuit 41 with drive signals to rotate the conveyer motor 42 in the forward direction as shown in Step 53 of FIG. 5. Thus, the drive pulleys 17 of the conveyer means 16 are driven in the clockwise direction in FIG. 1 so that the conveyer belt 15 is driven and the bill is moved toward the magnetic sensor 20.

Next, in Step 54, the discriminating circuit 40 decides whether or not the magnetic sensor 20 detects the ferrous component on the bill. When the magnetic sensor 20 detects the ferrous component on the bill, the discriminating circuit 40 determines that the paper inserted into the inlet 14 is a bill. Then, in step 55, the discriminating circuit 40 receives outputs as data of the inserted bill from the magnetic sensor 20 and inlet sensors 21 to 23. The magnetic sensor 20 forwards a plurality of signals derived from the ferrous material of the bill to the ferrous detector of the discriminating circuit 40 which then stores these data.

Subsequently, in Step 58, the discriminating circuit 40 ceases drive signals to the conveyer motor 42 to stop operation of the conveyer motor 42, and the first and second comparators of the discriminating circuit 40 compares the received optical and magnetic detection signals with the predetermined optical and magnetic patterns stored in the optical and magnetic pattern memories to determine whether or not these patters are coincident with the detection signals and thereby to determine whether the inserted bill is genuine or not (Step 57). After detection of the genuine bill in Step 57, the discriminating circuit 40 also decides a kind of bills or money amount from the detected magnetic pattern in Step 58.

In Step 58, the discriminating circuit 40 determines whether or not the bill is a predetermined one of money kinds. When the bill is one of the predetermined money kinds, the conveyer motor 42 is further driven in the forward direction in Step 59. When the bill passes through the lever 34, the lever sensor 37 detects the end of the rotated lever 34 and in Step 60 generates an output which the discriminating circuit 40 receives. After the bill has passed through the lever 34, the discriminating circuit 40 ceases outputs to stop operation of the conveyer motor 42 from Step 61 to 71.

When ferrous component is not detected from the inserted bill in Step 54, when the inserted bill is not genuine in Step 57 or when the bill is not any one of the predetermined money kinds in Step 58, the processing is moved to Step 62 wherein the discriminating circuit 40 drives the conveyer motor 42 in the reverse direction, and the bill is returned to the inlet 14. When the inlet sensors 21 to 23 detect nothing in Step 63, operation of the conveyer motor 42 is stopped in Step 61, and then the processing moves to Step 71.

In Step 51, when the discriminating circuit 40 decides that it is not in the validating mode, the processing moves to Step 64 where it judges whether it is in the master mode. If it is not in the master mode, the processing is returned to Step 50. If the master discriminating circuit 40 decides the master mode in Step 64 by the master mode switch 48 turned to ON, in Step 65, the slave mode switch 49 is turned ON to switch the slave discriminating circuit 40 to the slave mode. After that, in Step 66, the trigger switch 47 of the master is turned ON so that the download program is operated in the writable memory 43 (Step 67). Successively, in Step 68, the master discriminating circuit 40 forwards the download information from the master writable memory 43 through the master download output terminal 44 and slave download input terminal 46 to the ROM 45 of the slave discriminating circuit 40. Then, the download information is downloaded on and written in the slave writable memory 43 in Step 69. Thus, the download operation is finished (Step 70).

The mode of the present invention may be varied apart from the foregoing embodiment. The trigger switch 47, master mode switch 48 and slave mode switch 49 may be sensors for detecting some signals or electronic means provided by programmed control.

INDUSTRIAL APPLICABILITY

Accordingly, the present invention is advantageous in various aspects. Firstly, the download operation of the invention does not require any specified personal computer or dedicated hardware for downloading. Therefore, the download operation for bill validators in particular in the field is very easy in a timesaving way. Secondly, it is very easy to provide a master validator because the validator can be utilized as either of a master and a slave for download operation. Also, a master validator can be used to convert a plurality of slave validators into masters for self-duplication of software control program. To this end, the master validator can be simultaneously or independently connected with a plurality of the slave validators. In other words, the validators can easily be updated or upgraded for software control program by the download operation to modify or substitute the operational sequence or modes.

What is claimed is:

1. A bill validator (10) of master-slave type which includes a frame (28); a passageway (13) provided within said frame (28); conveyer means (16) for transporting a bill inserted from an inlet (12) through said passageway (13) to an outlet (14) along said passageway (13); sensor means (20 to 26) positioned in vicinity of said passageway (13) for detecting magnetic or optical feature of the bill; and discriminating means (40) for deciding based on signals from said sensor means (20 to 26) whether the bill is genuine or false to control drive of said conveyer means (16);

said bill validator comprising:

a download input terminal (46) and a download output terminal (44) provided in said discriminating means (40) which include download information; master mode setting means (48) for switching said discriminating means (40) from a validating mode to a master mode;

slave mode setting means (49) for switching said discriminating means (40) from the validating mode to a slave mode; and a writable memory (43) provided in said discriminating means (40) to write therein the download information including a download program;

whereby said discriminating means (40) is switched from the validating mode to the master mode by operation of said master mode setting means (48) to forward said download information to a slave discriminating means (40) according to said download program;

said slave discriminating means (40) is switched from validating mode to a slave mode by operation of said slave mode setting means (49), said download information from said master discriminating means (40) being written in said writable memory (43) of said slave discriminating means (40) via said download output terminal (44) of said master discriminating means (40) and said download input terminal (46) of said slave discriminating means (40).

2. The bill validator of claim 1, wherein said download information starts to be written in said slave discriminating means (40) when trigger means (47) of said master discriminating means (40) is switched to a download mode after said slave discriminating means (40) is switched to the slave mode.

3. The bill validator of claim 2, wherein said master mode setting means (48) including a master mode switch (48), said slave mode setting means (49) including a download mode switch (49), and said trigger means (47) including a trigger switch (47).

4. The bill validator of claim 1, wherein said discriminating means (40) includes a CPU mask ROM (45) for storing slave mode setting program, said writable memory (43) comprising a flash memory or an EPROM for storing said download program.

5. The bill validator of claim 1, wherein said writable memory (43) includes necessary information of the software control programs and download program for download.

6. The bill validator of claim 5, wherein said writable memory (43) includes a flash memory or an EPROM for storing a download program including control programs for validating bills and driving the conveyer.

7. The bill validator of claim 1, further comprising a ROM (45) which includes a writable or memorizable and calculable or computable CPU mask ROM or hybrid IC for storing and executing a slave mode setting program.

8. A method for download of a validator comprising the steps of:

electrically connecting download output terminal (44) of a discriminating circuit (40) of a master validator with download input terminal (46) of a discriminating circuit (40) of a slave validator;

switching the discriminating circuit (40) of said master validator to a master mode and also switching the discriminating circuit (40) of said slave validator to a slave mode;

reading out download information including a download program from a writable memory (43) of the master discriminating circuit (40) to operate the download program;

forwarding the download program from the master writable memory (43) through the master download output terminal (44) and slave download input terminal (46) to a ROM (45) of the slave discriminating circuit (40); and writing the download information in the slave writable memory (43).

9. The method of claim 8, wherein said discriminating circuit (40) of said master validator is switched to a master mode by operating a master mode switch (48).

10. The method of claim 8, wherein said discriminating circuit (40) of said slave validator is switched to a slave mode by operating a slave mode switch (49).

11. The method of claim 8, further comprising operating a trigger switch (47) to start the download operation.

* * * * *